June 9, 1964 R. E. LOUDON 3,136,989

READ-OUT AND CODE TRANSLATING SYSTEM

Original Filed March 30, 1959 3 Sheets-Sheet 1

READ-OUT AND CODE TRANSLATING SYSTEM

Original Filed March 30, 1959

United States Patent Office 3,136,989

Patented June 9, 1964

3,136,989

READ-OUT AND CODE TRANSLATING SYSTEM

Robert E. Loudon, Los Angeles, Calif., assignor to Clary Corporation, San Gabriel, Calif., a corporation of California Continuation of application Ser. No. 802,778, Mar. 30, 1959. This application Jan. 15, 1962, Ser. No. 172,364
9 Claims. (Cl. 340—347)

This invention relates to read-out apparatus for electronic data handling equipment or like and has a particular reference to a read-out apparatus capable of translating information registered in a combinational unit code into a single unit code.

In one form of apparatus of the above type, as exemplified by the disclosure in the copending application of R. E. Loudon et al., Serial Number 781,153, filed December 17, 1958, now U.S. Patent No. 3,077,590, a matrix of contacts are formed in patterns which are arranged in accordance with a particular combinational code being used. A scanning device operating in time with a registering or recording device successively scans the different patterns of contacts and electrically compares such patterns with the coded information being read out. When a comparison is obtained the recording device is actuated to record the appropriate characters, for example decimal digits.

One problem encountered in an apparatus of the above type is that the recording device may be actuated two or more times during a cycle. This is due to the fact that in many combinational unit codes a unit representing a single numeral digit character may be combined with one or more other units to represent a second single digit or character. Thus, as the scanning device successively scans the various patterns of contacts during the cycle it may successively effect two or more registrations or recordings, all but one of which would be unwanted.

A principal object of the present invention is to provide a relatively simple apparatus to overcome the above noted problem.

Another object is to provide a read-out system for translating any type of combinational unit code into a single unit code.

Another object is to provide a read-out system for concurrently translating and reading out information from an electronic data handling apparatus having any type of combinational unit coded output.

The manner in which the above and other objects of the invention are accomplished will be readily understood on reference to the following specification when read in conjunction with the accompanying drawings, wherein.

This application is a continuation of my copending application Serial No. 802,778, now abandoned, filed on March 30, 1959.

Figures 3, 4:
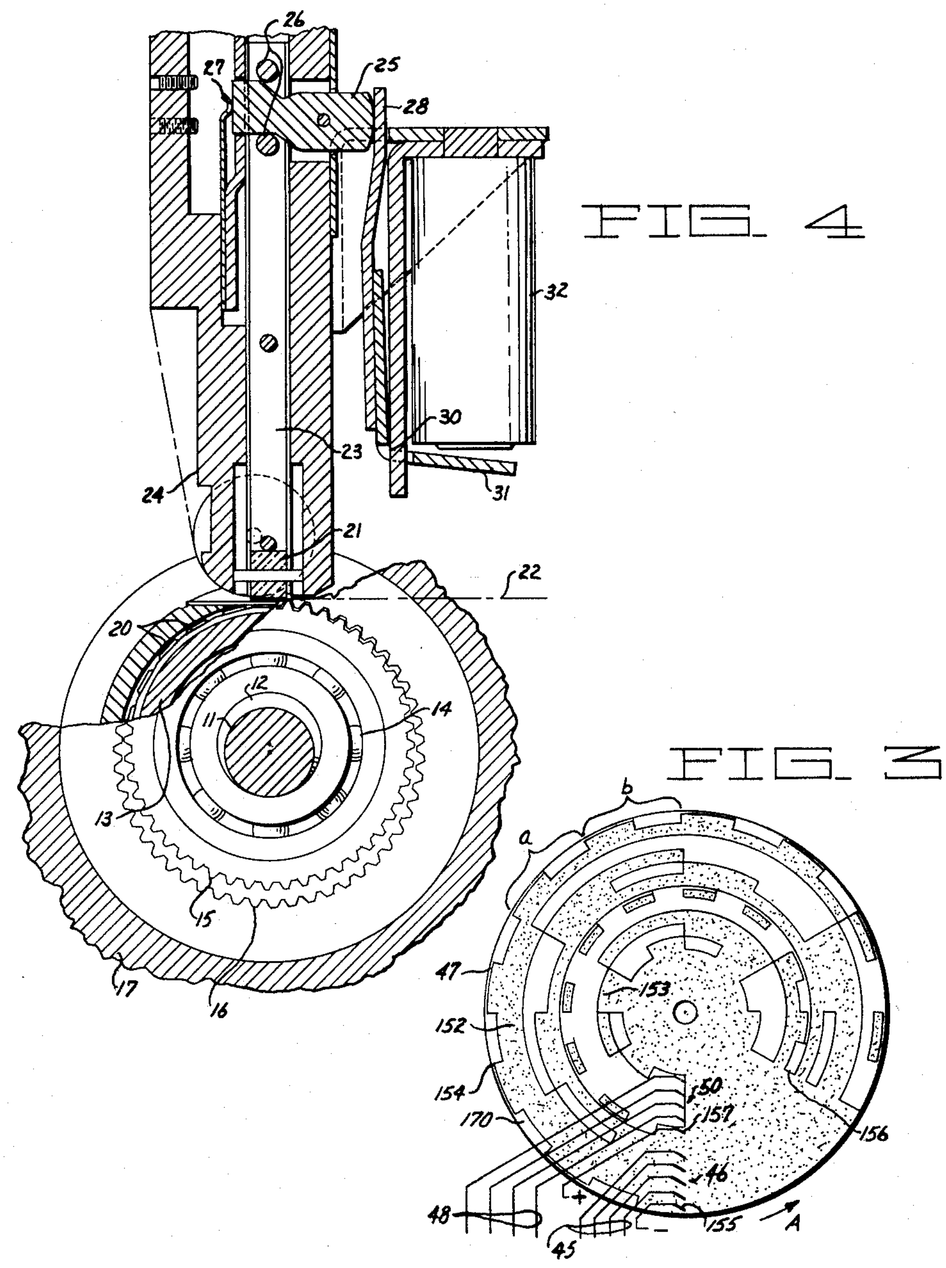
FIG. 3 is a front view of a commutator disc for use in translating the binary coded decimal system into the decimal system.
FIG. 4 is a transverse sectional view through part of a digit recording device chosen for illustration in connection with the present invention.

Describing first the printing mechanism shown in FIG. 4, such mechanism is disclosed and claimed in different aspects in the copending applications of E. O. Witt et al. Serial Number 770,719 filed on October 30, 1958 and since matured into Patent No. 2,915,968, issued on December 8, 1959, and C. A. Christoff et al. Serial Number 787,543 filed on January 19, 1959 and since matured into Patent No. 2,910,936, issued on November 3, 1959. Therefore, only a general description of such printing mechanism will be given herein and reference may be had to the above copending applications for a complete understanding thereof.

The printing mechanism comprises a rotatable drive shaft 11 rotatably supported in bearings not shown. The shaft 11 has eccentric bearing portions 12 which rotatably support a printing drum 13 through ball bearings 14. An external gear 15 is fixed on the drum, concentric therewith and meshes with an internal gear 16 arranged concentrically of the shaft 11 and suitably secured in a frame section 17.

Figure 1:
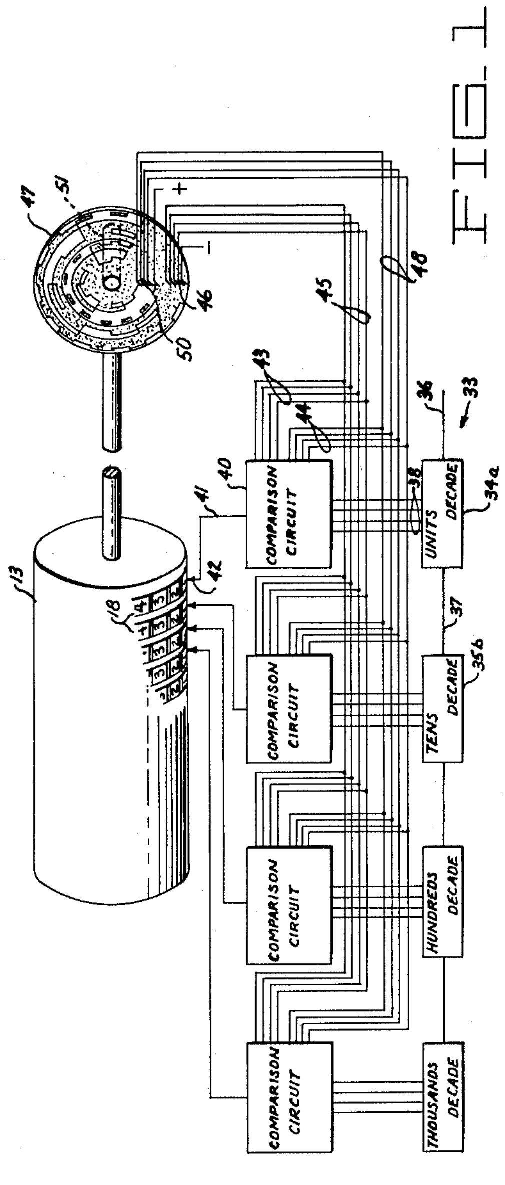
FIG. 1 is a general schematic view of an apparatus embodying a preferred form of the present invention.

The printing drum 13 has a plurality of rows 18 of type printing characters extending therearound as indicated in FIG. 1, each row containing digit type characters 20, FIG. 4, ranging in value from zero to nine.

The printing drum 13 is divided into a number of type character spaces therearound and the number of external teeth on the gear 15 is equal to such number or to an equal integral multiple thereof. The internal gear 16 contains the same number of teeth plus one or plus such multiple number of teeth so that upon each rotation of the shaft 11 and consequent orbital movement of the printing drum 13 about the center of the shaft 11, the drum will creep from one type character space to the next relative to a printing station established by a row of platens, one of which is shown at 21, there being one such platen for each row 18 of type characters.

The various type characters are substantially aligned with the pitch diameter of the gear 15 as will be seen in FIG. 4. Accordingly, as the type drum center moves in an orbit about the center of the internal gear 16, a part of each type character will describe a hypocycloidal curve so that as each type character reaches the apex of its outward travel, it will be moving substantially radially outward. If at this time a printing platen 21 has been positioned inwardly toward the type drum against a paper strip 22, printing contact will occur to transfer a printing impression from the type character to the paper. Suitable means (not shown) is provided to apply ink to the type characters.

Describing now the means for positioning the platens 21 in and out of printing position, such platens are located in side by side location in line with the respective rows 18 of the type characters 20 and are fixed in slides 23 guided for longitudinal movement in slots formed in a stationary guide block 24.

Cam bars 25 extend between side rails forming the slides 23 and have camming surfaces thereon cooperable with a pair of pins 26 attached to the slides whereby to raise and lower the platen. Normally, the cam bars are held inwardly as shown in FIG. 4, whereby to maintain the respective platen 21 raised out of printing position, by a leaf spring 27 suitably attached to the guide block. The right-hand ends of the cam bars 25 engage arms 28 pivotally supported at 30 and provided with tabs 31 forming armatures cooperable with electro magnets 32.

Energization of the magnet 32 will rock its associated arm 28 counterclockwise, thereby actuating its cam bar 25 to lower the respective platen 21 into printing position relative to the aligned row of type characters on the printing drum.

According to the present invention, means are provided for selecting and timing the positioning of the various type platens 21 in printing position so as to selectively print amounts registered on an electronic counter register or the like generally indicated at 33. The latter is of a type effective to register a combinational unit code and in this disclosure is intended to represent the binary coded decimal type code. The register includes a plurality of decades, i.e. a units decade 34*a*, tens decade 35*b*, etc. Each decade comprises four stages representing successively, the weighted values "one," "two," "four" and "eight."

An example of such counting register circuits may be found in the patent issued to F. Schwend, Number 2,767,-907 on October 23, 1956, wherein four bi-stable stages 25, 26, 27 and 28 are interconnected to operate as one decade of a counter register.

The register 33 includes an input line 36 to receive pulses to be counted. The various decades are connected by lines 37 whereby each decade will receive a carry-over pulse when a preceding decade has registered ten pulses. When one of four output lines 38 connected to the different stages of a decade represents a binary zero it is rendered relatively low in potential, i.e., approximately −10 volts, whereas when such output line of such decade represents a binary one, the output potential is relatively high, i.e., approximately zero volts.

The groups of output lines 38 from the various counter decades are connected as input lines to respective comparison circuits 40. The output 41 of each comparison circuit is connected to a printer selector magnet energizing circuit, indicated in FIG. 1 by an arrow 42, effective to cause energization of the electro magnet 32 (FIGS. 2 and 4) in the corresponding denominational order of the printer. Two additional groups of input lines 43 and 44 are also connected to each comparison circuit 40. The groups of input lines 43 are connected to trunk lines 45 serving all like input groups for the different comparison circuits. Such trunk lines 45 are connected to respective ones of a group of stationary brushes 46 associated with a commutator disc 47. The other group of input lines 44 of each comparison circuit is connected through a second group of trunk lines 48 to a second group of stationary brushes 50 also associated with the commutator disk 47.

The commutator disc 47 is carried by a shaft 51, and is formed of insulating material having two groups 152 and 153 (FIG. 3) of concentrically arranged contacts formed thereon and arranged to pass under respective ones of the groups of brushes 46 and 50. The contacts of group 152 are electrically connected together independently of the group 153 and are electrically connected to an outer broken conductor ring 154. Contact portions of the latter are in wiping contact with a stationary brush 155 connected to a source of −10 volts potential. Likewise, the group of contacts 153 are electrically connected together and to a broken conductor ring 156 whose contact portions are arranged in wiping contact with stationary brush 157 connected to a source of +10 volts potential.

As set forth in the above copending applications, the commutator disc 47 is operatively connected to the printing drum 13 in such manner that it advances its contact from one contact section i.e., section *a* of FIG. 3, to the next section, i.e. section *b*, as the drum advances from one type character space to the next.

Accordingly, as the commutator disc 47 rotates in the direction of the arrow A (FIG. 3), a relatively high potential is applied to different combinations of lines 44 depending on the configurations of the group 153 of contacts on the disc. Likewise, a relatively low potential will be supplied to different combinations of the lines 43 depending on the configuration of the group 152 of disc contacts.

The contacts 152 are so arranged and located relative to the printing drum that the combination of negative potentials applied to lines 43 at any one time represent a combinational code corresponding to a particular numeral digit type character passing under the platens 21 at that time. On the other hand, the contacts 153 are arranged in a manner complemental to the contacts 152 so that the positive potentials applied to the lines 44 will be complemental to the negative potentials applied to the lines 43.

Only when a combination of negative potentials on lines 43 match the positive potentials registered on the output lines 38 of the corresponding counter decade and the combination of positive potentials on lines 44 match the negative potential registered by such counter decade output lines will an output pulse be applied over line 41 to effect printing.

It should be noted that all duplicate type characters in the different circumferential rows 18 of the type drum are in line with each other in a direction parallel to the axis of the drum. Therefore, all duplicate digits in different denominational orders of the drum will be similarly printed when a code emitted by the commutator matches a combinational code registered by the respective counter decades. Obviously the register and the printed may incorporate any desired number of denominational orders.

Figure 2:
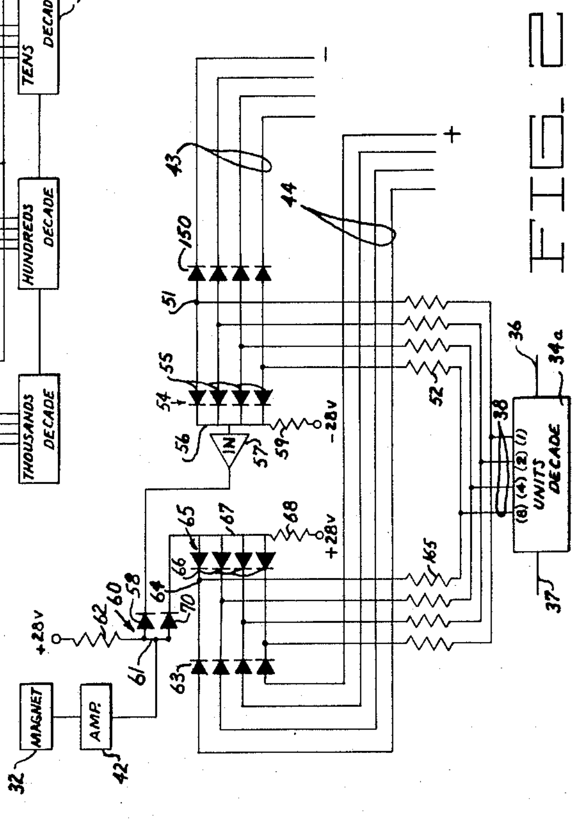
FIG. 2 is a detailed schematic view illustrating one denominational unit of the apparatus.

FIG. 2 illustrates in detail the comparison circuit 40 for controlling the units order print selector magnet 32 from the units decade 34*a*, it being understood that the details of the remaining comparison circuits are similar. Here, the group of input lines 43 are connected through crystal diodes 150, points 51 and resistors 52 to the output lines 38 for the units decade 34*a*.

An "and" gate 54 for low potentials is provided, comprising four diodes 55 having their anodes connected to the points 51 of connection to different lines 43. The cathodes of these diodes are connected to a line 56 which in turn is connected through a resistor 59 of 470,000 ohms to a source of −28 volts potential. The line 56 is connected through a potential inverting circuit 57 to the cathode of an input diode 58 of an "and" gate generally indicated at 60, for high potentials. The anode of the latter diode is connected through a line 61 and resistor 62 of 270,000 ohms to a source of +28 volts potential.

A group of input lines 44 are connected through diodes 63, points 64, and resistors 165 of 47,000 ohms each to the output lines 38 of the decade. An "and" gate 65 for high potentials has the cathodes of its input diodes 66 connected to points 64 while the anodes are connected to a common line 67 which, in turn, is connected through a resistor 68 of 270,000 ohms to a source of +28 volts potential. Line 67 is connected to a cathode of a second diode 70 of the and gate 60.

Describing now the operation of the circuit, assume that the units decade 34*a* registers the binary value 0011, representative of the decimal digit 3. In such case, the output lines 38 having the weighted values "1" and "2" each register a high potential and the lines having the weighted values "4" and "8" register a relatively low potential. As the commutator disc 47 rotates, different combinations of high and low potentials are applied over the groups of input lines 43 and 44 without effecting operation of the comparison circuit to energize the units order magnet 32. However, when a combination of potentials corresponding to the digit 3 are received over the lines 43 and 44, i.e., when a combination of low potentials is applied to the upper two diodes 150 and a combination of high potentials is applied to the upper two diodes 63 the following occurs. Potential is lowered on the anodes of the two upper diodes 55 and since the potential on the lower two diodes is already at a relatively low potential due to the lower potential of the output lines "4" and "8," the potential of line 56 will drop substantially to the value of the potential supply connected thereto. Accordingly, the inverter circuit 57 will apply a relatively high potential to the output of the and gate 60.

Simultaneously, as a high potential is applied through the upper two diodes 63 to the cathodes of the two upper diodes 66, the potential of the line 67 will rise substantially to the value of the potential source connected thereto since the lower two diodes 66 are already standing at a high potential as the result of their connection to the output lines "1" and "2." Therefore, potential will rise in line 67 to raise the output of gate 60 and this will be applied through the amplifier 42 to energize the magnet 32 to thereby effect printing of the digit decimal value 3.

It will be seen from the foregoing that only the value registered will be printed and no ambiguous printing can be effected regardless of the relationships with the combinations of potentials received from the commutator disc.

Considering the commutator disc to be rotated in the direction of the arrow A in FIG. 3, the contacts of the broken conductor rings 154 and 156 are so arranged that contact is made therewith by brushes 155 and 157, respectively, after the brushes 46 and 50 are in full wiping contact with the appropriate ones of the respective groups of contacts 152 and 156.

It should be understood that the aforementioned apparatus may be used to translate and record information recorded in various coded forms, it being only necessary to replace the commutator disc 47 with a commutator disc having an appropriate pattern of contact sections.

The cycle control circuit disclosed in the copending application of Robert E. Loudon, Serial Number 781,153, filed December 17, 1958 may be embodied in the circuit of the present invention to initiate a print cycle and terminate the same after a complete rotation of the commutator disc.

Figure 5:
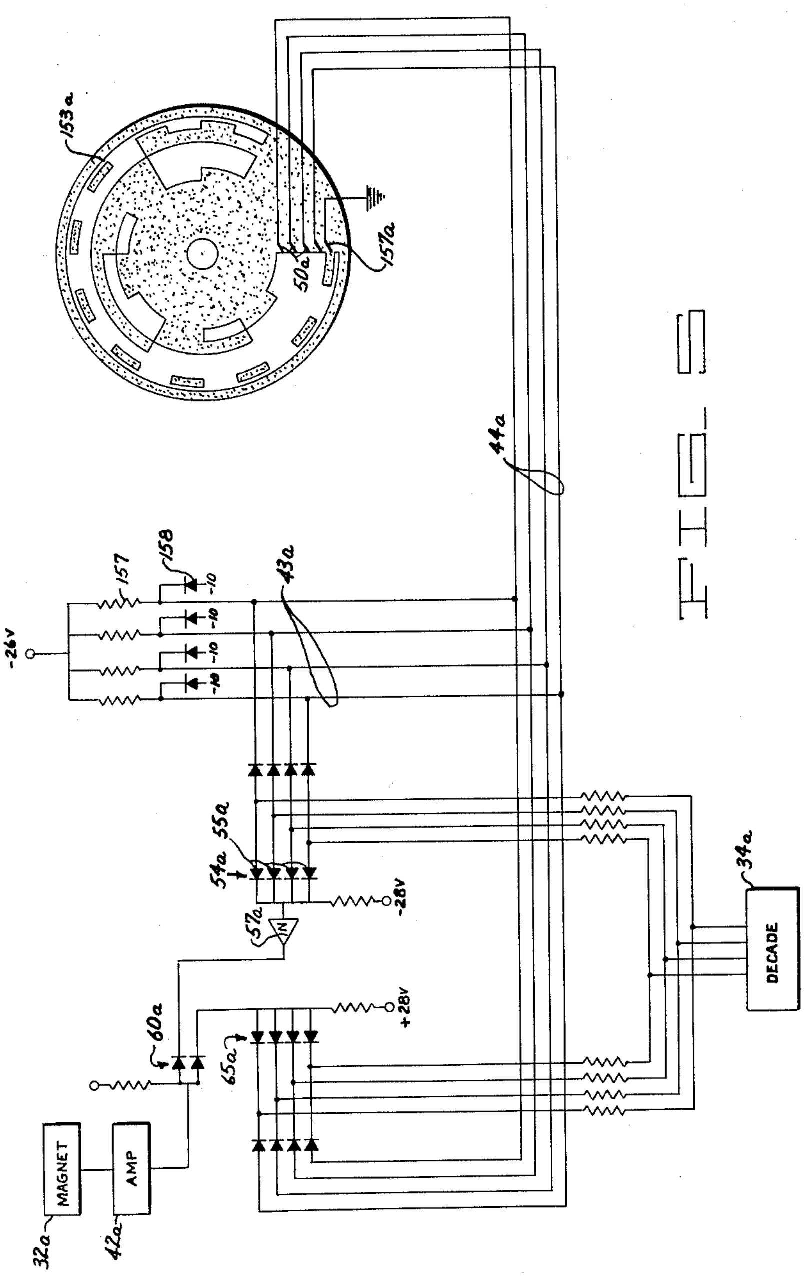
FIG. 5 is a detailed schematic view of a modified form of the invention.

FIG. 5 illustrates a modified form of the invention wherein the group of contacts corresponding to group 152 (FIG. 3) is omitted and only group **153*a*, corresponding to group 153, is retained, thus reducing the number of wiping contacts. In this case, the brushes 50*a* associated with the contacts 153*a* are connected to respective ones of lines 44*a*, and such lines are connected directly to respective ones of the lines 43*a***.

A source of −26 volts potential is connected through suitable resistors 157 to respective ones of the lines **43*a*. Clamping diodes 158, having their anodes connected to a −10 volt potential supply are connected to the lower ends of the resistors 157 to normally clamp the lines 43*a*** at −10 volts.

The contacts **153*a* are connected together and are intermittently connected to a source of positive potential through a brush 157*a*. They are so arranged relative to the printing drum that the combination of positive potentials applied to the lines 43*a* and 44*a*** at any one time represent the complement of the code for the particular numerical digit type characters located at the printing point at that time.

It will be noted that a negative potential will normally be applied through the resistors 157 and to the input diodes **55*a* of the and gate 54*a***.

When a combination of relatively positive (ground) potentials derived from the commutator contacts **153*a* complement the positive potentials derived from the output of the decade 34*a*, the and gate 65*a* will operate to apply a positive potential to the lower input diode of the and gate 60*a*. Also, when such combination of ground potentials is applied to the lines 43*a*, all of the inputs of gate 54*a* will be held at low potential to cause this gate to operate to apply a negative potential to the inverter 57*a*. The inverter will therefore pass a positive potential to the gate 60*a***.

The gate **60*a* when having both inputs high will pass a positive potential through an amplifier 42*a* and a magnet 32*a*** to thereby effect a print operation.

Although I have described my invention in detail, and have therefore used certain specific terms and language herein, it is to be understood that the present disclosure is illustrative rather than restrictive and that changes and modifications may be made without departing from the spirit or scope of the invention as set forth in the appended claims.

Having thus described the invention, what I desire to secure by United States Letters Patent is:

1. A read-out system for an apparatus having a plurality of terminals which indicate different digits by invariable combinations of steady state high and low potentials on different ones of said terminals comprising the combination of a member having type elements spaced thereon representing respective ones of said digits, a device for effecting recording by any one of said type elements, means for moving said member to sequentially advance said type elements past said recording device, a first matrix of elements arranged in patterns to represent the said possible combinations of low potentials on said terminals, a second matrix of elements arranged in patterns to represent the said possible combinations of high potentials on said terminals, scanning devices for respective ones of said matrices, means for causing relative scanning movement between said scanning devices and said matrices in time with said member whereby said scanning devices scan said patterns representing respective ones of said type elements as said respective type elements pass said recording device, and means responsive jointly to the potentials on said terminals and to the said scanning device for said first matrix upon scanning a pattern of said elements in said first matrix corresponding to the said terminals having low potentials thereon and to the said scanning device for said second matrix upon scanning a pattern of the said elements in said second matrix corresponding to the said terminals having high potentials thereon for actuating said recording device.

2. In a read-out system for an apparatus having a plurality of terminals which indicate different digits by invariable combinations of steady state high and low potentials on different ones of said terminals comprising the combination of a member having type elements thereon representing respective ones of said digits, a device for effecting recording by any one of said type elements, means for moving said member to sequentially advance said type elements past said recording device, a first matrix of elements arranged in patterns to represent the said possible combinations of low potentials on said terminals, means for applying a low potential to said matrix, a second matrix of elements arranged in patterns to represent the said possible combinations of high potentials on said terminals, means for applying a high potential to said second matrix, sensing devices for respective ones of said matrices, means for causing relative movement between said sensing devices and said matrices in time with said member whereby said sensing devices sense said patterns representing respective ones of said type elements as said respective type elements pass said recording device, and means controlled jointly by the said potentials on said terminals and by said sensing devices for said first matrix upon sensing a pattern of low potentials on said first matrix corresponding to the said terminals having low potentials thereon and by said sensing devices for said second matrix upon sensing a pattern of high potentials on said second matrix corresponding to the said terminals having high potentials thereon for actuating said recording device.

3. A read-out system for an apparatus having a plurality of terminals which indicate different digits by invariable combinations of first steady state potentials of one character and second steady state potentials of a second character on different ones of said terminals comprising the combination of a member having type elements spaced thereon representing respective ones of said digits, a device for effecting recording of said type elements, means for moving said member to sequentially advance said type elements past said recording device, a first matrix of elements arranged in patterns to represent the said possible combinations of said first potentials on said terminals, a second matrix of elements arranged in patterns to represent the said possible combinations of said second potentials on said terminals, sensing devices for respective ones of said matrices, means for causing relative movement between said sensing devices and said matrices in time with said member whereby said sensing devices sense said patterns representing respective ones of said type elements as said respective type elements pass said recording device, and means controlled jointly by the said potentials on said terminals and by said sensing devices for said first matrix upon sensing a pattern in said first matrix corresponding to the said terminals having said first potentials thereon and by said sensing devices for said second matrix upon sensing a pattern in said second matrix corresponding to the said terminals having said second potentials thereon for actuating said recording device.

4. A read-out system for an apparatus having a plurality of terminals which indicate different digits by invariable combinations of steady state high and low potentials on different ones of said terminals comprising the combination of a member having type elements spaced thereon representing the respective ones of said digits, a device for effecting recording by any one of said type elements, means for moving said member to sequentially advance said type elements past said recording device, a first matrix of contacts arranged in patterns to represent the said possible combinations of low potentials on said terminals, means for applying a low potential to said matrix, a second matrix of contacts arranged in patterns to represent the said possible combinations of high potentials on said terminals, means for applying a high potential to said second matrix, brush devices for said matrices of contacts, means for causing relative scanning movement between said brush devices and said matrices in time with said member whereby said brush devices wipe said patterns representing respective ones of said type elements as said respective type elements pass said recording device, a first control circuit, a second control circuit, circuit means controlled by said brush devices for said first matrix upon wiping a pattern of said contacts in said first matrix corresponding to the said terminals having low potentials thereon for energizing said first control circuit, circuit means controlled by said brush devices for said second matrix upon wiping a pattern of said contacts in said second matrix corresponding to the said terminals having high potentials thereon for energizing said second control circuit, and means responsive to concurrent energization of both of said control circuits for actuating said recording device.

5. A read-out system for an apparatus having a plurality of terminals representing different weighted values, respectively, said terminals indicating different digits by invariable combinations of steady state high and low potentials on different ones of said terminals, comprising the combination of a member having type characters spaced thereon representing respective ones of said digits, a device for effecting recording by any one of said type characters, means for moving said member to sequentially advance said type characters past said recording device, a first matrix of contacts arranged in patterns to represent the said possible combinations of low potentials on said terminals, means for applying a low potential to said matrix, a second matrix of contacts arranged in patterns to represent the said possible combinations of high potentials on said terminals, means for applying a high potential to said second matrix, first brush devices representing said different weighted values, respectively, said brush devices being in wiping contact with said first matrix, second brush devices representing said different weighted values, respectively, said second brush devices being in wiping contact with said second matrix, means for causing relative scanning movement between said brush devices and said matrices in time with said member whereby said brush devices wipe said patterns representing respective ones of said type characters as said respective type characters pass said recording device, circuit means including a first set of impedance elements connecting different ones of said first brush devices with correspondingly valued ones of said terminals; circuit means including a second set of impedance elements connecting different ones of said second brush devices with correspondingly valued ones of said terminals; a first "and" gate circuit for high potentials having inputs connected to respective ones of said brush devices; a second "and" gate circuit for low potentials having inputs connected to respective ones of said second brush devices; and means responsive to concurrent energization of both of said gate circuits for actuating said recording device.

6. In a recording system for an apparatus having a plurality of terminals which indicate different characters by respective combinations of steady state relatively high and low potentials on different ones of said terminals, a type drum having type elements spaced therearound representing different ones of said characters, an electrically controlled device for effecting recording by any one of said type elements onto a record medium, and means for continuously advancing said drum to sequentially advance said type elements under said recording device, the combination comprising a first circuit including a first electrical "and" gate having two inputs and an output effective when energized to cause operation of said recording device; a second circuit including a second electrical "and" gate having a number of inputs equal to the number of said terminals, said second circuit being effective only upon application of relatively low potentials to all of said inputs of said second gate for energizing one of said inputs of said first gate; a third circuit including a third electrical "and" gate having a number of inputs equal to the number of said terminals, said third circuit being effective only upon application of relatively high potentials to all of said inputs of said third gate for energizing the other of said inputs of said first gate; means connecting said terminals to respective inputs of said second and third gates, and means comprising a code generating device operable in synchronism with said type drum for rendering those inputs of said second gate which are not maintained at low potentials by said terminals at low potentials and for rendering those inputs of said third gate which are not maintained at high potentials by said terminals at high potentials only when a type element currently under said recording device corresponds to a character represented by a combination of high and low potentials on said terminals.

7. In a recording system for an apparatus having a plurality of terminals which indicate different characters by respective combinations of steady state relatively high and low potentials on different ones of said terminals, a type drum having type elements spaced therearound representing different ones of said characters, an electrically controlled device for effecting recording by any one of said type elements onto a record medium, and means for continuously advancing said drum to sequentially advance said type elements under said recording device, the combination comprising a first circuit including a first electrical "and" gate having two inputs and an output effective when energized to cause operation of said recording device; a second circuit including a second electrical "and" gate having a number of inputs equal to the number of said terminals, said second circuit being effective only upon application of relatively low potentials to all of said inputs of said second gate for energizing one of said inputs of said first gate; a third circuit including a third electrical "and" gate having a number of inputs equal to the number of said terminals, said third circuit being effective only upon application of relatively high potentials to all of said inputs of said third gate for energizing the other of said inputs of said first gate; means connecting said terminals to respective inputs of said second and third gates, and means comprising a code generating device operable in synchronism with said type drum for lowering the potential of those inputs of said second gate which are maintained at relatively high potential by said terminals and for raising the potential of those inputs of said third gate which are maintained at relatively low potential by said terminals only when a type element currently under said recording device corresponds to a character represented by a combination of high and low potentials on said terminals is under said recording device.

8. In a recording system for an apparatus having a plurality of terminals which indicate different characters by respective combinations of steady state relatively high and low potentials on different ones of said terminals, a type drum having type elements spaced therearound representing different ones of said characters, an electrically controlled device for effecting recording by any one of said type elements onto a record medium, and means for continuously advancing said drum to sequentially advance said type elements under said recording device, the combination comprising a first electrical "and" gate having two inputs and an output effective when energized to cause operation of said recording device; a second electrical "and" gate having a number of inputs equal to the number of said terminals and an output connected to one of said inputs of said first gate, said second gate being effective only upon application of relatively low potentials to all of said inputs thereof for energizing the output thereof to produce a relatively low potential; a third electrical "and" gate having a number of inputs equal to the number of said terminals and an output connected to the other input of said first gate, said third gate being effective only upon application of relatively high potentials to all of said inputs thereof for energizing the output thereof to produce a relatively high potential, a potential inverting circuit connected in series with the output of one of said second and third gates, means connecting said terminals to respective inputs of said second and third gate, and means comprising a code generating device operable in synchronism with said type drum for rendering those inputs of said second gate which are not maintained at low potential by said terminals at low potentials and for rendering those inputs of said third gate which are not maintained at high potential by said terminals at high potential only when a said type element currently under said recording device corresponds to a character represented by a combination of high and low potentials on said terminals.

9. In a recording system for an apparatus having a plurality of terminals which indicate different characters by respective combinations of steady state relatively high and low potentials on different ones of said terminals, a type drum having type elements spaced therearound representing different ones of said character, an electrically controlled device for effecting recording by any one of said type elements onto a record medium, and means for continuously advancing said drum to sequentially advance said type elements under said recording device, the combination comprising a first electrical "and" gate having two inputs and an output effective when energized to cause operation of said recording device; a second electrical "and" gate having a number of inputs equal to the number of said terminals and an output connected to one of the inputs of said first gate, said second gate being effective only upon application of relatively low potentials on all of said inputs thereof for energizing the output thereof to produce a relatively low potential; a third electrical "and" gate having a number of inputs equal to the number of said terminals and an output connected to the other input of said first gate, said third gate being effective only upon application of relatively high potentials on all of said inputs thereof for energizing the output thereof to produce a relatively high potential, a potential inverting circuit connected in series with the output of one of said second and third gates, and means comprising a code generating device operable in synchronism with said type drum for lowering the potential of those inputs of said second gate which are maintained at relatively high potential by said terminals and for raising the potential of those inputs of said third gate which are maintained at relatively low potential by said terminals only when a type element currently under said recording device corresponds to a character represented by a combination of high and low potentials on said terminals.

References Cited in the file of this patent

UNITED STATES PATENTS

| | | |
|---|---|---|
| 2,910,685 | Shafer | Oct. 27, 1959 |
| 2,910,686 | Rohland | Oct. 27, 1959 |
| 2,929,556 | Hawkins | Mar. 22, 1960 |

UNITED STATES PATENT OFFICE
CERTIFICATE OF CORRECTION

Patent No. 3,136,989 June 9, 1964

Robert E. Loudon

It is hereby certified that error appears in the above numbered patent requiring correction and that the said Letters Patent should read as corrected below.

Column 6, line 71, after "recording" insert -- by any one --.

Signed and sealed this 3rd day of November 1964.

(SEAL)
Attest:

ERNEST W. SWIDER
Attesting Officer

EDWARD J. BRENNER
Commissioner of Patents